United States Patent [19]

Grosclaude et al.

[11] Patent Number: 5,393,800
[45] Date of Patent: Feb. 28, 1995

[54] TWO-COMPONENT COATING FORMULATION

[75] Inventors: Gary V. Grosclaude, Torrington; Andrew G. Bachmann, Harwinton, both of Conn.

[73] Assignee: Dymax Corporation, Torrington, Conn.

[21] Appl. No.: 839,830

[22] Filed: Feb. 21, 1992

[51] Int. Cl.$^6$ .............. C08F 4/80; C08F 2/48; C08F 224/00; C08F 220/18

[52] U.S. Cl. ............. 522/28; 522/29; 522/170; 522/174; 522/182; 522/181; 522/183; 526/147; 526/192; 526/273; 526/301; 526/282

[58] Field of Search ............. 526/147, 192; 522/28, 522/29, 170, 174, 182

[56] References Cited

U.S. PATENT DOCUMENTS

| | | | |
|---|---|---|---|
| H509 | 8/1988 | Chao | 526/264 |
| 2,859,200 | 11/1958 | Lappala | |
| 2,921,045 | 1/1960 | DiMartino | |
| 2,922,774 | 1/1960 | Mino et al. | 526/147 X |
| 3,658,624 | 4/1972 | Lees | 156/310 |
| 3,925,282 | 12/1975 | Davis et al. | 260/23 H |
| 4,052,244 | 10/1977 | Skoultchi | 156/310 |
| 4,126,504 | 11/1978 | Wolinski | 156/310 |
| 4,348,503 | 9/1982 | Bachmann | 525/455 |
| 4,424,252 | 1/1984 | Nativi | 428/209 |
| 4,820,744 | 4/1989 | Kubota et al. | 522/13 |
| 4,956,221 | 9/1990 | Gutek | 428/142 |
| 4,963,220 | 10/1990 | Bachmann et al. | 156/307 |
| 4,964,938 | 9/1990 | Bachmann et al. | 156/273.7 |
| 5,039,715 | 8/1991 | Bachmann et al. | 522/13 |

FOREIGN PATENT DOCUMENTS 58-189213  11/1983  Japan .

OTHER PUBLICATIONS

"Complexes In Free-Radical Polymerization", (Polymer Science Library 6, Inst. of Polymers of the Centre for Chemical Research, Slovak Academy of Sciences, Bratislava, Czechoslovakia, Elservier, 1988) Bartoh and Borsig-pp. 42–50, 247 and 248.

*Primary Examiner*—Mark Nagumo
*Attorney, Agent, or Firm*—Ira S. Dorman

[57] ABSTRACT

A catalyst system for effecting polymerization in a two-part formulation, which contains an oxygen-containing ethylenically unsaturated monomer, consists of a selected acid, a selected aromatic amine compound, and a transition metal compound; active-oxygen, free-radical catalysts are excluded. Because of the nature of the catalyst system, efficient reaction does not require intimate mixing of the two components of the formulation, which may therefore be applied effectively as fine-droplet sprays from a common, ultrasonically vibrated head.

10 Claims, 1 Drawing Sheet

TWO-COMPONENT COATING FORMULATION

BACKGROUND OF THE INVENTION

Two-part acrylate formulations are well known in the art for use as adhesives, potting compounds, conformal coatings, and the like. In addition to including polymerizable acrylate monomers, such formulations typically include elastomeric fillers (e.g., urethane oligomers, preferably capped to provide sites of unsaturation for enhanced reactivity), adhesion promoters in the form of organic acids (e.g., acrylic and methacrylic), inert fillers, supplemental adhesion promoters (e.g.) silanes), leveling agents, and other ingredients. Reaction in formulations of this kind is normally initiated by use of a free-radical, active-oxygen catalyst (i.e., a peroxide, a hydroperoxide, or a perester), activated thermally, chemically (e.g., with an amine/aldehyde adduct and transition metal accelerator), aerobically, anaerobically, etc; they may additionally or alternatively include a photoinitiator that is responsive to actinic radiation.

Illustrative of the prior art that is germane to the acrylate formulations hereinabove referred to are the following Bachmann and Bachmann et al United States patents, all of which are of common assignment herewith: U.S. Pat. Nos. 4,348,503, issued Sep. 7, 1982; 4,429,088, issued Jan. 31, 1984; 4,432,829, issued Feb. 21, 1984; 4,963,220, issued Oct. 16, 1990; 4,974,938, issued Oct. 23, 1990; and 5,039,715, issued Aug. 13, 1991.

Other prior art of interest to the subject matter to which the instant application pertains are the following, each of which is also a patent of the United States: Lappala, U.S. Pat. No. 2,859,200, issued Nov. 4, 1958, DiMartino U.S. Pat. No. 2,921,045, issued Jan. 12, 1960, Lees U.S. Pat. No. 3,658,624, issued Apr. 25, 1972, Skoultchi U.S. Pat. No. 4,052,244, issued Oct. 4, 1977, Wolinski et al U.S. Pat. No. 4,126,504, issued Nov. 21, 1978, Nativi U.S. Pat. No. 4,424,252, issued Jan. 3, 1984, Kubota et al U.S. Pat. No. 4,820,744, issued Apr. 11, 1989, Gutek U.S. Pat. No. 4,956,221, issued Sep. 11, 1990, and Chao Registration No. H509, published Aug. 2, 1988.

The Lappala and DiMartino patents disclose the combined use of a number of ingredients for the catalysis of acrylate systems; for example, DiMartino describes a methylmethacrylate cement that includes methacrylic acid and is catalyzed by cobalt naphthenate, MEK peroxide, and diethylaniline, used in combination. The Lees patent lists complimentary accelerators, including a monocyclic carbocyclic aromatic acid (e.g., benzoic), trichloroacetic acid, and phenoxyacetic acid. The two-part adhesive disclosed by Skoultchi includes p-toluene sulfinic acid, and Wolinski et al disclose a system that includes an acid (e.g., acrylic) and a free-radical, active-oxygen catalyst (e.g., benzoyl peroxide), in which reaction is initiated by a tertiary amine (e.g., dimethyl-p-toluidine). Both Nativi and Gutek provide compositions that afford shadow curing capability, and Gutek discloses UV-curing as being suitable for printed circuit board applications.

Despite the activity in the art indicated by the foregoing, a demand exists for a highly effective two-part formulation comprised of polymerizable, oxygen-containing ethylenically unsaturated (e.g., acrylate) monomers, which is suitable for use as an adhesive, for potting, for conformal coating, and for other like applications, which formulation does not depend upon a free-radical, active-oxygen catalyst for initiation of reaction.

Accordingly, it is a broad object of the present invention to provide a novel formulation having such features and advantages.

A related object of the invention is to provide such a formulation from which highly satisfactory cured deposits can be produced despite the lack of intimate admixture of the two components of which it is comprised.

A corresponding object of the invention is to provide a novel catalyst system for use in such formulations.

Another corresponding object is to provide a novel method for the production of an adherent, solid deposit in a highly facile and yet efficient manner, utilizing a two-part formulation of the character described.

SUMMARY OF THE INVENTION

It has now been found that certain of the foregoing and related objects of the invention are attained by the provision of a two-part, solvent-free liquid formulation, comprising a first component that includes an acid ingredient that is substantially soluble in the polymerizable composition, and a second component that includes an aromatic amine compound having the general formula:

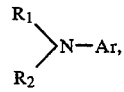

wherein each of "$R_1$" and "$R_2$" is selected from the class consisting of hydrogen and an alkyl group, and wherein "Ar" is selected from the class consisting of a monocyclic and polycyclic aromatic groups. At least one of the components of the formulation additionally includes a transition metal compound, and the acid ingredient employed must be capable of forming a coordination compound with the metal thereof. Either or both of the components of the formulation are comprised predominantly of a polymerizable composition that includes one or more oxygen-containing ethylenically unsaturated polymerizable ingredients; the formulation is free from any free-radical, active-oxygen polymerization catalyst (i.e., a compound containing the peroxy group).

In preferred embodiments, the aromatic amine compound employed will be selected from the group consisting of N,N-(alkyl)-toluidines in which the alkyl group contains one to three carbon atoms, N-methylaniline, N,N-dimethylaniline, aniline, N,N-bis(2-hydroxyethyl)-p-toluidine, dimethyl aminostyrene, 4-dimethylaminobenzoic acid, ethyl-4-dimethylamino benzoate, N,N-dimethyl-p-amino benzyl alcohol, and mixtures thereof. The metal compound utilized in the formulation will desirably be an ingredient of the first component, and will normally be of a metal selected from the class consisting of cobalt, iron, cerium, copper, lead, manganese and vanadium. The acid or acids employed will preferably be selected from the class consisting of acrylic, methacrylic, acetic, ascorbic, oxalic, phthalic, itaconic, crotonic, 4-methoxyphenyl acetic, 3,5-dihydroxybenzoic, 3,3-dimethylaminobenzoic, and p-toluenesulfonic. The polymerizable ingredient will preferably be an acrylate monomer, and will, for many applications, desirably be admixed with a prepolymer selected from the group consisting of urethane (meth)acrylates, epoxy (meth)acrylates, and urethane epoxy- (meth)acrylates. In especially preferred embodiments, at least one of the components of the formulation will additionally include an effective amount of a photoinitiator that is capable, when activated, of catalyzing polymerization of the polymerizable ingredient.

The formulation may more specifically comprise (in percentages based upon the total weight thereof) 0.05 to 10, and preferably 1 to 4, of the acid ingredient, 0.05 to 10.0 of the aromatic amine compound, 0.002 to 1.5 of the metal compound, and 20 to 96 of the polymerizable composition. The polymerizable monomer may itself comprise 20 to 96 weight percent of the formulation; and when included, the prepolymer may constitute as much as 60 weight percent of the formulation, and more typically 20 to 40 percent thereof.

Other objects of the invention are attained by the provision of a catalyst system comprising the above-identified acid, amine compound, and transition metal compound. Still other objects of the invention are attained by the provision of a method for the production of an adherent solid deposit upon a substrate, utilizing the two-part formulation described herein to form a liquid deposit upon a substrate, which is cured to produce the solid. The method will desirably be carried out using a formulation that includes an effective amount of a photoinitiator, in which instance the curing step will normally be initiated by exposure of the liquid deposit to actinic radiation.

In preferred embodiments of the method, admixture of the components of the formulation will be effected immediately prior to their contact with the substrate, as will desirably be achieved by interspersal of fine-droplet sprays thereof; ultrasonic apparatus, comprised of a spray head and delivery means, will most desirably be used for that purpose. The spray head of such apparatus may, more particularly, have opposite side surface portions, or faces, that are preferably planar, are oriented substantially parallel to one another, and terminate at a common transverse plane at one end of the head. The delivery means serves to deliver the formulation components separately but concurrently, and generally continuously, to the opposite faces of the head at points spaced from the common plane at which they terminate, so as to form a thin film of each of the formulation components moving therealong. Operation of the apparatus will cause the spray head to vibrate ultrasonically, on an axis parallel to its side faces, thereby producing adjacent sprays of the components issuing from the end of the head. The substrate is disposed outwardly of the common plane, and is spaced from the spray head a distance sufficient to permit substantial interspersion of the formulation components prior to contact therewith. For optimal use in such ultrasonic applications, each of the formulation components will desirably have a viscosity in the range 80 to 200 centipoise, as measured at 25° Centigrade, albeit that heating may be necessary to lower the viscosity (e.g., to 50 centipoise or less) for actual application; the technique will normally be carried out on a continuous basis, as by conveying the substrates to be coated under the spray head and thereafter past a UV irradiation source.

DETAILED DESCRIPTION OF THE PREFERRED AND ILLUSTRATED EMBODIMENTS

Figure 1:
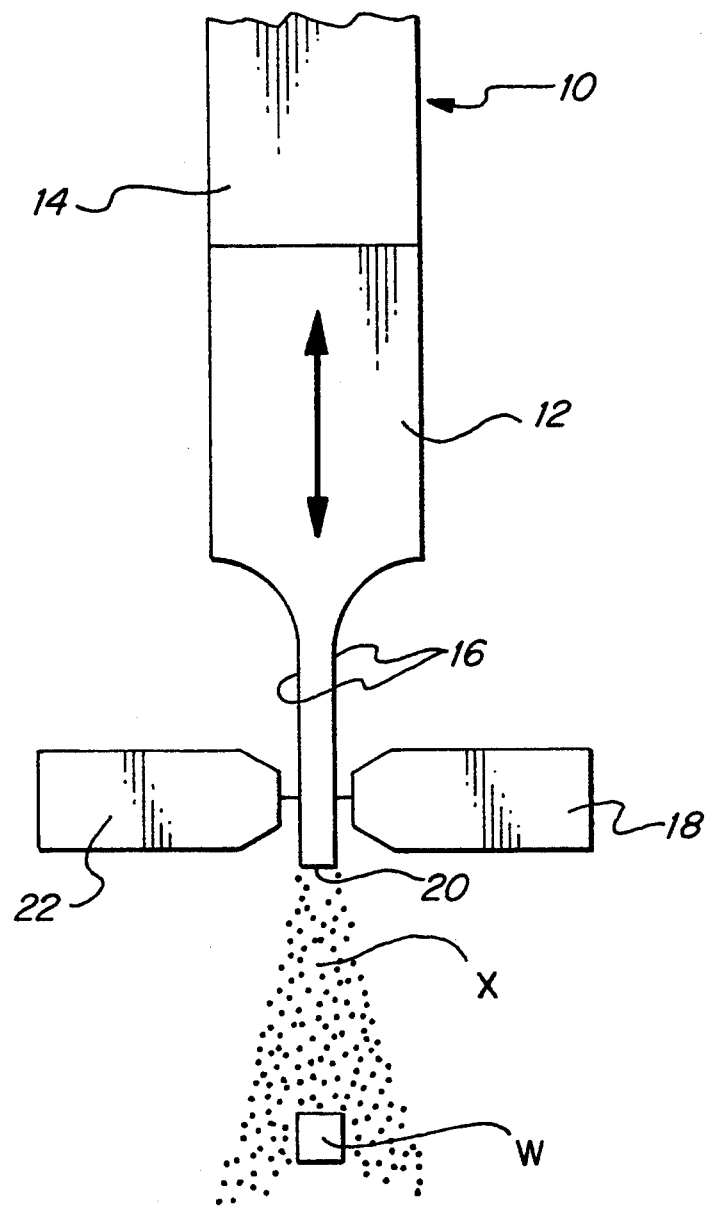
FIG. 1 of the drawing is a diagrammatic elevational view of an ultrasonic delivery system suitable for use in carrying out the method of the instant invention.

The system diagrammatically illustrated in FIG. 1 is comprised of an ultrasonic head assembly, generally designed by the numeral 10, and a pair of liquid delivery nozzles 18, 22. The head assembly consists of a head portion 12 and a drive portion 14, the latter serving to vibrate ultrasonically the head portion 12 along its longitudinal (normally vertical) axis; i.e., in the direction indicated by the double-headed arrow. The head portion 12 has parallel, planar faces 16 on its opposite sides, terminating at an end surface 20 disposed in a transverse (normally horizontal), bottom plane.

The two components of the coating formulation are delivered separately to the opposite faces 16 of the head portion 12, through one or the other of the nozzles 18, 22, moving along the faces under the influence of the ultrasonic vibration and being atomized to issue from the free end as two adjacent sprays. The sprays converge and intersperse at a point (such as "X") outwardly of the end surface 20, to mix and thereafter deposit upon the workpiece "W" as a complete formulation.

Exemplary of the efficacy of the present invention are the following Examples, in which all parts and percentages stated are by weight, unless indicated otherwise; viscosities are expressed as measured at 25° Centigrade. Except where other products are identified, the prepolymer used in these Examples is a polyetherurethane acrylate oligomer produced from an aromatic isocyanate and a polypropyleneoxide diol, and capped with 2-hydroxyethylacrylate, commercially available from Bomar, Inc., of Winsted, Conn.; it contains only trace amounts of terminal isocyanate.

EXAMPLE ONE

To 40 parts of the above-identified oligomer is added 5 parts of 2-hydroxyethylmethacrylate, 39.5 parts of isobornylacrylate (IBOA), 2 parts of dimethoxy-2-phenylacetophenone (Ciba-Geigy IRGACURE 651), 2 parts of 1-hydroxycyclohexylphenyl ketone (Ciba-Geigy IRGACURE 184), and 1.5 parts of a methacryloxypropyltrimethoxy silane adhesion promotor commercially available from Union Carbide Corporation under the trade designation SILANE 174. The mixture is stirred until all of the ingredients are dissolved, resulting in a solution containing approximately 44.4 percent of the polyetherurethane acrylate oligomer.

To 45 parts of the oligomer solution is added 5 parts of N,N-dimethyl-p-toluidine, to provide component A of a formulation embodying the invention. Component B is provided by adding to 45 parts of the same oligomer solution 4.7 parts of acrylic acid, and 0.3 part of a solution of cobalt naphthenate in IBOA monomer, made by dissolving one part of a commercially available, 8 percent cobalt naphthenate solution in 10 parts of IBOA.

Equal amounts (by volume) of components A and B are admixed and thereafter sprayed (from a commercially available spray can system containing a nonflammable propellant) onto the surface of a printed circuit board (PCB) substrate, to which a number of components are surface mounted. The damp boards are exposed to ultraviolet radiation for a period of about two seconds and at an energy level of 170 milliwatts/cm², while being conveyed past the UV lamp at a speed of 10 feet/minute; the coating is thereupon found to have developed a tack-free surface. After standing for about 10 minutes at room temperature, several of the surface mounts are removed from the PCB substrate to reveal unirradiated "shadow" areas, which are found to be dry and tack-free.

EXAMPLE TWO

A solution is prepared by admixing 40 parts of capped polyether urethane oligomer with 40 parts of IBOA, 6.5 parts of 2-hydroxyethyl methacrylate, 2 parts of IRGACURE 651, 2 parts of IRGACURE 184, and small amounts of other additives and stabilizers known in the industry for use in acrylate adhesive formulations.

To 45 parts of the resultant oligomer solution is added 5 parts of acrylic acid, to form component A of the formulation used herein; component B is prepared from 48.5 of the same solution, to which are added 1 part of N,N-dimethyl-p-toluidine and 0.5 part of the cobalt naphthenate/IBOA solution described in Example One. Both components (A and B) have a viscosity of about 100 centipoise, and are sprayed simultaneously, and at substantially the same volumetric rate, onto a PCB substrate bearing a number of surface-mounted electronic components; the sprays intersperse with one another prior to contact with the PCB surface.

The damp boards are exposed to ultraviolet irradiation for a period of 20 seconds, using a lamp rated at 170 milliwatts/cm², whereupon the coating is found to be tack-free. Following a 24-hour rest period at room temperature, unirradiated areas under the surface mounts are examined, and found to be fully cured.

EXAMPLE THREE

This Example employs ultrasonic coating apparatus like that of FIG. 1, which includes a titanium head or "horn" driven by a piezoelectric crystal and having parallel, planar opposite side faces that are vertically oriented in the apparatus and that terminate at a flat, horizontal end face. Quantities of components A and B of the formulation of Example Two are delivered continuously, and at substantially the same rate, to the side faces of the ultrasonic head. The head is vibrated at 20 kilohertz to produce mist-like sprays of both components issuing adjacently from the end face, the droplets of which sprays are believed to be approximately 30 to 50 microns in average diameter.

A PCB substrate is placed several inches below the operating head, so that the sprays of the two components of the formulation intersperse and coalesce prior to contact with the surface, ultimately producing a uniform deposit on the substrate. After curing under UV irradiation, in the manner hereabove described in Example Two, a clear and tough, dry, solid conformal coating is produced on the substrate.

EXAMPLE FOUR

Part A

A masterbatch for a potting and encapsulating formulation is prepared by mixing 50 parts of urethane oligomer, 25 parts of 2-hydroxyethylmethacrylate, 212 parts of IBOA, 25 parts of a cellulosic-acrylate thickener (commercially available from Bomar, Inc. under the trade designation J-LINK), 25 parts IRGACURE 184, 25 parts of acrylic acid, and 12.5 parts of SILANE 174. A first component is prepared by adding 1 part of N,N-dimethyl-p-toluidine to 24 parts of the above-described masterbatch; a second component is prepared by adding 1 part of the previously described cobalt naphthenate/IBOA solution to 22.5 parts of the masterbatch. The two components are mixed with one another and allowed to cure for approximately one hour, producing a clear, tough gel with a slightly tacky surface; exposure to UV-light for 15 seconds renders the surface dry and tack-free.

Part B

A fresh mixture of the same two components is introduced into the cavity of a nylon shell, and cured in the manner described above. A tough plug is produced, which displays good adhesion to the nylon surface.

Part C

Repeating Part A hereof, but using 2.5 parts (rather than 1 part) of the cobalt naphthenate solution, results in a deposit of the same character but which cures to the gelled state in approximately 10 minutes' time.

EXAMPLE FIVE

Component A of a potting formulation is prepared by admixture of 63 parts of 2-hydroxyethylmethacrylate, 60 parts of IBOA, 24 parts of tetrahydrofurfurylacrylate, 15 parts IRGACURE 184, 111 parts of the urethane-acrylate oligomer, 6 parts of Silane 174, and 6 parts of N,N-dimethyl-p-toluidine. Component B employs the same ingredients in the same amounts, but excludes the amine ingredient and substitutes 30 parts of acrylic acid and 1.5 parts of the above-described cobalt naphthenate/IBOA solution.

An equal-parts admixture of components A and B is introduced into the power chamber of a metal golf club; cure occurs in less than one hour. After allowing the part to stand overnight at room temperature, pull tests demonstrate that the deposit attains an excellent level of adhesion to the walls of the chamber.

EXAMPLE SIX

The acrylate monomers listed in Table One below are used to form potting compounds in which no prepolymer is included, utilizing a masterbatch having the composition: 21.9 parts of the selected acrylate monomer; 2 parts of acrylic acid; 0.1 part of the previously described cobalt naphthenate/IBOA solution, and 1 part of N,N-dimethyl-p-toluidine. Gel times realized following simple admixture, expressed in minutes, are set forth in the Table.

TABLE ONE

| MONOMER | GEL TIME |
| --- | --- |
| hydroxyethyl methacrylate | 4 |
| isobornyl acrylate | 3 |
| octyl/decyl acrylates (mixture) | 8 |
| tripropyleneglycol diacrylate | Instantaneous |
| trimethylolpropane triacrylate | Instantaneous |
| di-trimethylolpropane tetraacrylate | Instantaneous |
| di-pentacrythritol pentacrylate | Instantaneous |

EXAMPLE SEVEN

A masterbatch is prepared by admixture of 88 parts of 2-hydroxyethylmethacrylate, 8 parts of acrylic acid, and 0.4 part of the cobalt naphthenate/IBOA solution described. To 24 parts of this masterbatch is added 1 part of each of the amines set forth in Table Two, which follows; gel times (in minutes) are indicated.

TABLE TWO

| AMINE | GEL TIME |
| --- | --- |
| N,N-dimethyl-p-toluidine | 4 |
| N,N-dimethyl-o-toluidine | 8 |
| N,N-dimethyl-m-toluidine | 3.5 |
| N,N-dimethylaniline | 5 |
| N-methylaniline | 75 |
| aniline | 120 |
| ethyl-4-dimethylamino benzoate | 20 |

Comparable results are achieved using the N,N-diethyl-, N,N-dipropyl-, and N,N-diisopropyl-toluidines (with the ring substitution in all positions), as well as with N,N-dimethyl-p-amino benzyl alcohol.

EXAMPLE EIGHT

A masterbatch is prepared by admixture of the following ingredients: 22 parts of hydroxyethylmethacrylate, 1 part of N,N-dimethyl-p-toluidine, and 0.1 part of the cobalt naphthenate/IBOA solution described; the mixture is heated to promote solubility. To 23.1 parts of the foregoing masterbatch (cooled to room temperature) is added 2 parts of each of the following acids; polymerization occurs in all instances, but at varying rates: oxalic, methacrylic, acetic, ascorbic, phthalic, 4-methoxyphenyl acetic, itaconic, crotonic, 3,3-dimethylaminobenzoic, and 3,5-dihydroxybenzoic.

EXAMPLE NINE

Admixture of 10 parts of polyethyleneglycol dimethacrylate (600 molecular weight) with 1 part of a 37 percent solution of hydrochloric acid, 1 part of N,N-dimethyl-p-toluidine, and 0.2 part of the cobalt naphthenate/IBOA solution previously described, produces a blue/green colored plug after 40 minutes reaction time.

EXAMPLE TEN

Component A of an encapsulating formulation is prepared by admixing 5 parts of 2-hydroxyethylmethacrylate, 52 parts of IBOA, 10 parts of tetrahydrofurfuryl acrylate, 25 parts of the urethane-acrylate oligomer, and 8 parts of N,N-dimethyl-p-toluidine. Component B consists of the same ingredients, but includes in addition 20 parts of acrylic acid and 1 part of the cobalt naphthenate/IBOA solution hereinabove described, and omits the amine.

To 25 parts of each of the components is added 25 parts of calcium carbonate, 2 parts of titanium dioxide, and 0.5 part of 2-hydroxy-2-methyl-1-phenylpropane-1-one (a photoinitiator commercially available from EM Industries under the trade designation DAROCUR 1173). A reactive mass is prepared by mixing equal quantities of the two components, and is poured into the cavity of a nylon shell; curing to the gel state is achieved in five minutes, and subsequent curing to produce a tack-free surface is effected by ultraviolet irradiation.

EXAMPLE ELEVEN

Part A

A formulation is prepared utilizing a masterbatch containing 30 parts of the urethane acrylate oligomer, 20 parts of 2-hydroxyethylmethacrylate, 34 parts of an octyl/decyl acrylate mixture, 5 parts of DAROCUR 1173 and 100 parts of cornstarch (ARGO brand, commercially available from Best Foods Corporation of Englewood Cliffs, N.J.). Component A of the formulation additionally contains 1 part of the above-described cobalt naphthenate/IBOA solution and 10 parts of acrylic acid; component B utilizes a second masterbatch of the same composition, to which is added 2.5 parts of N,N-dimethyl-o-toluidine and 12 parts of N,N-dimethyl-p-toluidine.

The two components are admixed in equal amounts, and the resultant formulation is poured into the cavity of an ABS plastic part. The mixture is found to have gelled within 15 minutes; the surface is rendered tack-free by exposure to UV-radiation (20 milliwatts/cm$^2$) for 15 seconds, and the deposit is found to display excellent adhesion to the plastic part.

Part B

Substituting varying amounts of other commercially available fillers (i.e., kaolin, mica, titanium dioxide, and wood flower, each suspended in hydroxyethylmethacrylate monomer) for the cornstarch used in Part A hereof is found to produce similar results.

EXAMPLE TWELVE

To 100 parts of bisphenol A diglycidyl ether (commercially available from Ciba-Geigy Corporation under the trade designation ARALDITE GY 6010) are added 10 parts of 2-hydroxyethylmethacrylate, 5 parts of acetic acid, 5 parts of N,N-dimethyl-p-toluidine, and 2 parts of the previously described cobalt naphthenate/IBOA solution. Gel is observed to have occurred within 15 minutes, and a hard, intractable mass is obtained after 24 hours.

EXAMPLE THIRTEEN

To 500 parts of the diglycidyl ether utilized in the previous Example are added 50 parts of divinyl ether, 10 parts of acetic acid, 5 parts of N,N-dimethyl-p-toluidine and 2 parts of the cobalt naphthenate/IBOA solution. Gel is observed after a short period of time, and full curing to a hard, stiff mass is obtained in 18 hours at room temperature.

EXAMPLE FOURTEEN

A series of reactive products are prepared by admixing, with 20.8 parts of each of the monomers hereinafter designated, 0.2 part of the cobalt naphthenate/IBOA solution, 3 parts of acrylic acid and 1 part of N,N-dimethyl-p-toluidine: (1) SIPOMER Q5-80 (a quaternization product of dimethylaminoethyl methacrylate and dimethyl sulfate, available from Alcolac Inc., of Baltimore, Md.), (2) ethyleneglycol divinyl ether, (3) triethyleneglycol divinyl ether, (4) diethyleneglycol divinyl ether, and (5) 4-acetoxystyrene. Curing is observed in all of the products, at varying rates.

Notwithstanding the foregoing Example, showing the desirability of using vinyl ethers in carrying out the invention, the polymerizable composition of the instant formulations will normally comprise a polymerizable acrylate monomer and a reactive oligomer or other prepolymer; albeit preferred in most instances, the prepolymer is not essential. Suitable such monomers and prepolymers are well known in the art, and are at least in part disclosed at line 53, column 6, through line 35, column 7 of the above-mentioned Bachmann et al U.S. Pat. No. 4,429,088, and at line 14, column 4 through line 52, column 5 of the above-mentioned Nativi et al U.S. Pat. No. 4,451,523, which disclosures are hereby incorporated by reference hereinto. Nevertheless, it will be appreciated from the Examples herein that preferred acrylate monomers include the following acrylates and corresponding methacrylates, used alone or in combination with one another: hydroxyethylacrylate, isobornyl acrylate, tetrahydrofurfuryl acrylate, octylacrylate and decylacrylate (normally in admixture), tripropyleneglycol diacrylate, trimethylolpropane triacrylate, di-trimethylolpropane tetraacrylate, and di-pentaerythritol pentaacrylate. As will also be appreciated from the foregoing, the preferred prepolymer will be a urethane-acrylate, an epoxy-acrylate, a urethane-acrylate-epoxy oligomer, or the corresponding methacrylate oligomers.

The acid constituent functions as one component of the catalyst system for the formulation; it is believed that the acid forms a coordination compound with the metal of the transition metal compound, and that such a mechanism is essential to the functionability of the formulations hereof. Organic acids used can be aromatic, aliphatic or aryl-aliphatic, and typical examples have been provided hereinabove. Furthermore, it need not be a carboxylic acid, and may for example be a sulfonic acid or, indeed, an inorganic acid such as hydrochloric or sulfuric. Although no specific pK values appear applicable, it has been observed that acids of excessive strength can effectively preclude a polymerization reaction that would otherwise take place if a weaker acid were used.

A second essential ingredient of the catalyst system is of course the aromatic amine. As will be appreciated from the general structural formula provided hereinabove, primary, secondary, and tertiary amines may be used; also, the aromatic ring may be monocyclic or polycyclic (e.g., a coumarin, fulvene or naphthalene derivative), and the chemical species and position of ring substitution may vary. It might be observed that the hardness of the cured deposit, as well as the cure rate of the formulation, tend to decrease in the order of tertiary, to secondary, to primary. The speed of cure, as well as coloration, also appear to relate somewhat to the position of substituents; the fastest rates are usually observed when para- and meta-substituted compounds are used, and the intensity of any coloration that is exhibited will tend to decrease with substitution in the meta, para, and ortho positions, in that order.

The third essential ingredient of the catalyst system is the transition metal compound, effective species of which have been listed hereinabove. Suitable compounds for use herein to provide the metal ion will be evident to those skilled in the art; the following are however exemplary: cobaltous naphthenate, ferric sulfate, cerium naphthenate, cupric naphthenate, manganese naphthenate, cobaltic acetylacetonate hydrate, vanadium acetylacetonate, and lead linoleate. The concentration in which this ingredient is used may vary widely, and will depend to an extent upon the other ingredients of the system and the results desired; however, the metal compound concentration will generally be such as to provide in the formulation an amount of the metal ion ranging from a trace to perhaps one part per thousand. It has been shown that increasing the amount of metallic ion present can produce a correspondingly pronounced affect upon the rate of cure, albeit that relatively high concentrations may produce excessive coloration.

As has been pointed out above, the instant formulations do not require the presence of any active-oxygen (i.e., peroxy group-containing), free-radical catalyst. Indeed, the incorporation of such compounds will often be deleterious from the standpoints of reducing the pot-life of any component in which they are incorporated (sometimes causing the same to set-up immediately), producing degradation due to a continuing exotherm following initiation of polymerization, causing embrittlement of the deposit, etc.

Although the theory by which the instant formulations cure is not fully understood, it is believed to involve the formation of radical cations (see Barton and Borsig "Complexes In Free-Radical Polymerization," Polymer Science Library 6, Elsevier 1988, pp 42–50), by proton transfer from the amine compound (e.g., the loss of hydrogen by an alkyl group adjacent the nitrogen atom). In any event, the reaction does not rely upon the presence of moisture, upon the presence or absence of oxygen, or upon heat to achieve the desired cure; needless to say, however, the rate of cure may be increased by temperature elevation.

It will often be highly desirable, as a practical matter, to include a photoinitiator in the formulation of the invention, and it will be self-evident that a photoinitiator will be prerequisite to certain applications. In those instances in which such an initiator is employed, the aromatic amine ingredient will serve a dual function; i.e., it will function as an integral component of the chemical catalyst system, and also to improve the efficiency of photoinitiation. Suitable photoinitiators are well known in the art, and specific illustrative compounds have been identified hereinabove; a further listing may be obtained by reference to the above-mentioned Kubota U.S. Pat. No. 4,820,744, particularly at line 43, column 4 through line 7, column 7. When used, the photoinitiator will normally be incorporated in a concentration of 1 to 8, and preferably no more than 4, percent, based upon the weight of the formulation.

Particularly in instances in which the formulation is to be used as a potting compound, it may be especially desirable to incorporate a chain transfer agent of the kind that is typically used in compositions cured by electron beam initiation; e.g., halogen compounds, sulfur compounds, and secondary and tertiary aromatic hydrocarbons such as cumeme, carbon tetrachloride, 1,4-disopropyl benzene, t-butyl benzene, bisphenol A and glycidyl ether derivatives thereof etc. The use of chain transfer agents may serve to increase the Shore D hardness of the resultant polymer, the degree of which will depend to an extent upon the concentration of the agent in the formulation, which typically will be 0.5 to 5.0, and usually 0.1 to 1.0, weight percent.

Compounds such as silane derivatives are well known as adhesion promoters in polymerizable acrylate compositions, and can be employed herein for that purpose. The low-molecular weight reactive acids (such as acrylic and methacrylic), which may be employed as the acid ingredient of the catalyst system, also function as highly effective adhesion promoters, and consequently the effect of silanes and the like is regarded to be supplementary. Plasticizers, inert fillers, and other ingredients conventionally employed in similar formulations may of course also be included, if so desired.

The two components of the formulation will be so formulated so as to produce, in combination, the desired final properties of the cured deposit, consistent with the provision of satisfactory shelf-life and pot-life of the individual and mixed components, good rheological and flow characteristics, and other necessary or desirable properties. Although the formulation is "solvent-free," it will be appreciated that small amounts of water and/or other solvents may be present, such as for the practical introduction of an ingredient (e.g., the metal compound, an acid, etc.). It will often be convenient to use the two components of the formulation in a 1:1 volumetric ratio, especially in those instances in which automatic application (such as by the ultrasonic spraying technique described above) is to be employed, and the components will be formulated accordingly; other ratios may of course be preferred in given instances.

Indeed, it is believed that a primary reason why the formulations embodying the invention can so readily and effectively be utilized without intimate mixing (e.g., by mere interspersal of sprays) stems from the fact that stoichiometric relationships are not required among the reactive ingredients. This is consistent with the hypothesis that reaction in these formulations occurs through a radical cationic mechanism; i.e., the growing polymer chains do not self-terminate or quench themselves, as does tend to occur in conventional free-radical propagated reactions.

Thus, it can be seen that the present invention provides a novel and highly effective two-part formulation comprised of polymerizable, oxygen-containing ethylenically unsaturated (e.g., acrylate) monomers, which is suitable for use as an adhesive, for potting, for conformal coating, and for other like applications. The formulation does not depend upon the use of a free-radical, active-oxygen catalyst for initiation of reaction, and highly satisfactory cured deposits can be produced from it despite the lack of intimate admixture of the two constituent components. The invention also provides a novel catalyst system for use in such formulations, as well as a novel method for the production of an adherent, solid deposit in a highly facile and yet efficient manner.

Having thus described the invention, what is claimed is:

1. A two-part, solvent-free liquid formulation that is innately curable to an adhesive solid, comprising a first component that includes an acid ingredient, and a second component that includes an aromatic amine compound having the general formula:

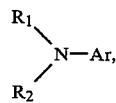

wherein each of "$R_1$" and "$R_2$" is selected from the class consisting of hydrogen and an alkyl group, and wherein "Ar" is selected from the class consisting of monocyclic and polycyclic aromatic groups, at least one of said components additionally including a transition metal compound, at least one of said components being comprised predominantly of a polymerizable composition including at least one oxygen-containing ethylenically unsaturated polymerizable ingredient, and at least one of said components including an effective amount of a photoinitiator capable, when activated, of catalyzing polymerization of said polymerizable ingredient, said acid ingredient being substantially soluble in said polymerizable composition and forming a coordination compound with the metal of said metal compound, said formulation containing no more than one part per thousand of the metal ion of said transition metal compound, and being devoid of any free-radical, active-oxygen polymerization catalyst.

2. The formulation of claim 1 wherein said amine compound is selected from the group consisting of N,N-(alkyl)-toluidines in which the alkyl group contains one to three carbon atoms, N-methylaniline, N,N-dimethylaniline, aniline, N,N-bis(2-hydroxyethyl)-p-toluidine, dimethyl aminostyrene, 4-dimethylaminobenzoic acid, ethyl-4-dimethylamino benzoate, N,N-dimethyl-p-amino benzyl alcohol, and mixtures thereof.

3. The formulation of claim 1 wherein said metal compound is admixed in said first component, and wherein both of said components are comprised predominantly of said polymerizable composition.

4. The formulation of claim 1 wherein said metal compound is a compound of a metal selected from the class consisting of cobalt, iron, cerium, copper, manganese and vanadium.

5. The formulation of claim 4 wherein said acid is a low molecular weight carboxylic acid selected from the class consisting of acrylic, methacrylic, acetic, ascorbic, oxalic, phthalic, itaconic, crotonic, 4-methoxyphenyl acetic, 3,5-dihydroxybenzoic, and 3,3-dimethylaminobenzoic acids.

6. The formulation of claim 1 wherein said polymerizable ingredient is an acrylate monomer.

7. The formulation of claim 1 wherein said polymerizable ingredient comprises a prepolymer selected from the group consisting of urethane (meth)acrylates, epoxy (meth)acrylates, and urethane epoxy-(meth)acrylates.

8. The formulation of claim 7 wherein said polymerizable composition comprises at least 20 weight percent of at least one acrylate monomer, and at least 20 weight percent of at least one prepolymer selected from said prepolymer group, based upon the weight of said formulation.

9. The formulation of claim 1 wherein said components are formulated for use in equal amounts.

10. The formulation of claim 1 comprising, in percentages based upon the total weight thereof, and 0.05 to 10 of said acid ingredient, 0.05 to 10 of said aromatic amine compound.

* * * * *

UNITED STATES PATENT AND TRADEMARK OFFICE
CERTIFICATE OF CORRECTION

PATENT NO. : 5,393,800
DATED      : February 28, 1995
INVENTOR(S): GARY V. GROSCLAUDE and ANDREW G. BACHMANN It is certified that error appears in the above-identified patent and that said Letters Patent is hereby corrected as shown below:

Claim 10, column 12, line 51, delete "and"; same claim line 52, insert before "0.05" the word --and--.

Signed and Sealed this

Fifth Day of September, 1995

Attest:

BRUCE LEHMAN

Attesting Officer       Commissioner of Patents and Trademarks